US010960360B2

(12) United States Patent
Shimura et al.

(10) Patent No.: US 10,960,360 B2
(45) Date of Patent: Mar. 30, 2021

(54) COMPOSITE SEMIPERMEABLE MEMBRANE AND COMPOSITE SEMIPERMEABLE MEMBRANE ELEMENT

(71) Applicant: TORAY INDUSTRIES, INC., Tokyo (JP)

(72) Inventors: Harutoki Shimura, Shiga (JP); Yoshiki Nishiguchi, Shiga (JP); Yohei Adachi, Shiga (JP); Takahiro Tokuyama, Shiga (JP); Kohei Kuraoka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/976,198

(22) PCT Filed: Feb. 28, 2019

(86) PCT No.: PCT/JP2019/007965
§ 371 (c)(1),
(2) Date: Aug. 27, 2020

(87) PCT Pub. No.: WO2019/168137
PCT Pub. Date: Sep. 6, 2019

(65) Prior Publication Data
US 2021/0001282 A1    Jan. 7, 2021

(30) Foreign Application Priority Data

Feb. 28, 2018 (JP) .............................. JP2018-034858
Feb. 28, 2018 (JP) .............................. JP2018-034859

(51) Int. Cl.
*B01D 69/12*      (2006.01)
*B01D 71/56*      (2006.01)
(Continued)

(52) U.S. Cl.
CPC ....... *B01D 69/125* (2013.01); *B01D 67/0093* (2013.01); *B01D 69/02* (2013.01);
(Continued)

(58) Field of Classification Search
CPC .... B01D 69/12; B01D 2323/30; B01D 69/10; B01D 69/125; B01D 71/60;
(Continued)

(56) References Cited

U.S. PATENT DOCUMENTS 6,177,011 B1    1/2001   Hachisuka et al.
6,280,853 B1 *   8/2001   Mickols ............. B01D 67/0093
                                                210/490
(Continued)

FOREIGN PATENT DOCUMENTS

EP      1 958 685 A1     8/2008
JP      2001-79372 A    3/2001
(Continued)

OTHER PUBLICATIONS

International Search Report, issued in PCT/JP2019/007965, dated May 21, 2019.
(Continued)

*Primary Examiner* — Ana M Fortuna
(74) *Attorney, Agent, or Firm* — Birch, Stewart, Kolasch & Birch, LLP

(57) ABSTRACT

By having a coating layer, this composite semipermeable membrane has fouling resistance easily maintainable before and after contact with acid, and enables stable operation over a long period of time. This composite semipermeable membrane comprises a porous support layer, a separation function layer arranged on the porous support layer, and a coating layer arranged on the separation function layer, wherein the separation function layer contains a crosslinked aromatic polyamide which is a polycondensate of polyfunc-
(Continued)

tional aromatic amines and polyfunctional aromatic acid chloride, and the coating layer contains an aliphatic polymer having the structure (I) in the description.

7 Claims, 1 Drawing Sheet

(51) Int. Cl.
*B01D 69/02* (2006.01)
*B01D 67/00* (2006.01)

(52) U.S. Cl.
CPC ........ *B01D 71/56* (2013.01); *B01D 2321/162* (2013.01); *B01D 2325/06* (2013.01); *B01D 2325/30* (2013.01); *B01D 2325/36* (2013.01)

(58) Field of Classification Search
CPC ....................... B01D 2323/36; B01D 2323/40; B01D 71/82; B01D 71/56; C02F 1/444; C02F 1/44
See application file for complete search history.

(56) References Cited

U.S. PATENT DOCUMENTS

| | | | |
|---|---|---|---|
| 8,672,142 B2* | 3/2014 | Nishiyama | B01D 67/0079 210/500.25 |
| 9,051,510 B1* | 6/2015 | Reyes | C09K 8/68 |
| 9,221,019 B2* | 12/2015 | Kang | B01D 65/08 |
| 10,220,355 B2* | 3/2019 | Kang | B01D 69/02 |
| 2002/0122647 A1* | 9/2002 | Blomquist | C08G 65/007 385/129 |
| 2009/0220690 A1* | 9/2009 | Niu | B01D 71/56 427/245 |
| 2013/0109262 A1 | 5/2013 | Zhou | |
| 2014/0251892 A1 | 9/2014 | Lee et al. | |
| 2017/0001151 A1* | 1/2017 | Na | B01D 67/0088 |
| 2020/0188861 A1 | 6/2020 | Hamada et al. | |

FOREIGN PATENT DOCUMENTS

| | | |
|---|---|---|
| JP | 2003-501249 A | 1/2003 |
| JP | 2010-240651 A | 10/2010 |
| JP | 2013-534464 A | 9/2013 |
| JP | 2015-516876 A | 6/2015 |
| WO | WO 97/34686 A1 | 9/1997 |
| WO | WO 2014/133133 A1 | 9/2014 |
| WO | WO 2018/003943 A1 | 1/2018 |

OTHER PUBLICATIONS

Written Opinion of the International Searching Authority, issued in PCT/JP2019/007965, dated May 21, 2019.

* cited by examiner

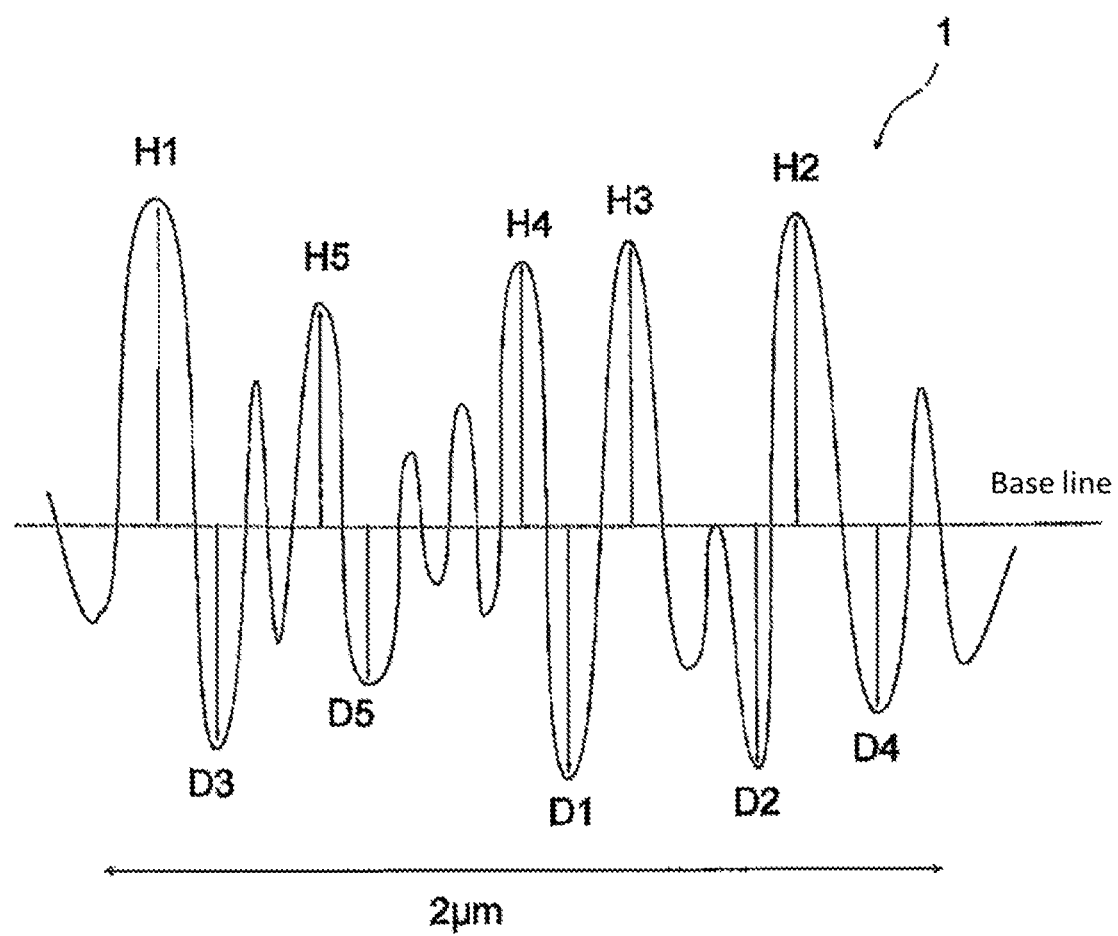

COMPOSITE SEMIPERMEABLE MEMBRANE AND COMPOSITE SEMIPERMEABLE MEMBRANE ELEMENT

TECHNICAL FIELD

The present invention relates to a semipermeable membrane useful for selective separation of liquid mixtures, and to a composite semipermeable membrane excellent in water permeability, fouling resistance and chemical resistance.

BACKGROUND ART

Examples of membranes used for membrane separation of liquid mixtures include microfiltration membranes, ultrafiltration membranes, nanofiltration membranes, reverse osmosis membranes, and the like, and these membranes are used for, for example, obtaining drinking water from water containing salts or harmful substances, production of industrial ultrapure water, wastewater treatment, collection of valuables, and the like.

Most of currently commercially available reverse osmosis membranes and nanofiltration membranes are composite semipermeable membranes, and among them, a composite semipermeable membrane (Patent Literature 1), which is obtained by coating a microporous support membrane with a separation functional layer formed of a crosslinked polyamide obtained by a polycondensation reaction of polyfunctional amines with polyfunctional acid halides, has been widely used as a separation membrane having high permeability and a high selective separation property.

However, when a composite semipermeable membrane is continuously used, foulant, such as organic substances, heavy metals, and microorganisms, adhere to a surface of the membrane, a permeation flux of the membrane tends to decrease, and chemical cleaning by an acid or an alkali is required after a certain period of operation. Therefore, there is a demand for a composite semipermeable membrane to which foulant hardly adhere and which has little changes in performances before and after cleaning with chemicals such as an acid and an alkali. As a method for improving adhesion of foulant, Patent Literature 2 has proposed a method for preventing fouling by neutralizing charged states by means of coating a surface of a separation functional layer with a polyvinyl alcohol, and Patent Literatures 3 and 4 have proposed a method for, for example, forming a coating layer containing a polyalkylene oxide.

CITATION LIST

Patent Literature

Patent Literature 1: JP-A-2001-79372
Patent Literature 2: WO97/34686
Patent Literature 3: JP-A-2003-501249
Patent Literature 4: JP-A-2015-516876

SUMMARY OF INVENTION

Technical Problem

However, in the techniques described in Patent Literatures 2 to 4, there are problems in that the effects of preventing adhesion of foulant are insufficient, membrane performances and fouling resistance decrease due to the cleaning by an acid or the storage in acidic solutions, and further the water permeability decreases by coating the separation functional layer. An object of the present invention is to provide a composite semipermeable membrane which has high water permeability, and stable performances and fouling resistance before and after contact with an acid.

Solution to Problem

In order to solve the above problems, the present invention has a configuration of any one of the following items [1] to [7].

[1] A composite semipermeable membrane including:
  a microporous support layer;
  a separation functional layer arranged on the microporous support layer; and
  a coating layer arranged on the separation functional layer,
  in which the separation functional layer contains a crosslinked aromatic polyamide which is a polycondensate of a polyfunctional aromatic amine and a polyfunctional aromatic acid chloride, and
  the coating layer contains an aliphatic polymer having a structure represented by the following formula (I).

[Chem. 1]

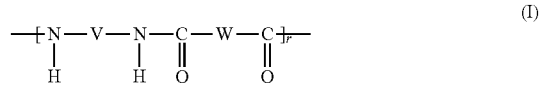

(wherein V is at least one structure selected from the structure group (i), W is at least one structure selected from the structure group (ii), and r is an integer of 2 or more.)

[Chem. 2]

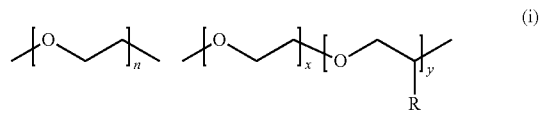

(wherein n is an integer of 1 or more and 100 or less, x and y are integers of 1 or more and 50 or less, and R refers to a methyl group.)

[Chem. 3]

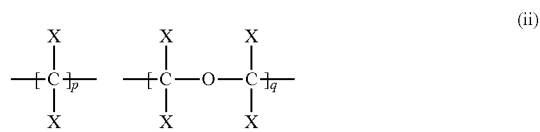

(wherein at least one of X's is a fluorine atom, and the other X('s) are a hydrogen atom, and p and q are integers of 1 or more and 10 or less.)

[2] The composite semipermeable membrane according to the above [1],
  in which an amide bond is formed between the aliphatic polymer and the crosslinked aromatic polyamide.

[3] The composite semipermeable membrane according to the above [1] or [2],
  in which a terminal of the aliphatic polymer is a carboxy group.

[4] The composite semipermeable membrane according to any one of the above [1] to [3], which satisfies the following conditions (A), (B), (C), and (D):
(A) intensity of a maximum peak between 3700 cm$^{-1}$ and 2900 cm$^{-1}$ is 0.08 or more in a difference spectrum of an infrared absorption (IR) spectrum measured under conditions of 25° C. and a relative humidity of 97% and an IR spectrum measured under conditions of 25° C. and a relative humidity of 3%;
(B) a peak top wave number of the difference spectrum between 3700 cm$^{-1}$ and 2900 cm$^{-1}$ is 3400 cm$^{-1}$ or more and 3550 cm$^{-1}$ or less;
(C) a peak of C1s has one or more maximum values within a range of 290 eV or more and 295 eV or less in X-ray photoelectron spectroscopy measurement performed by irradiating a coating layer side of the composite semipermeable membrane with X-rays; and
(D) the following formula (1): a+b≥10×(c+d+e) (1) is satisfied, in which a, b, c, d, e are respectively count numbers in the cases of m/z of positive secondary ions=45.03, 59.05, 104.03, 108.07, 135.06 when the coating layer side of the composite semipermeable membrane is measured by using time-of-flight secondary ion mass spectrometry.

[5] The composite semipermeable membrane according to the above [4], in which a limit depth from the coating layer side is 10 nm or less, at which at least one maximum value of the peak of C1s is detected within a range of 290 eV or more and 295 eV or less in the X-ray photoelectron spectroscopy measurement performed by irradiating the coating layer side of the composite semipermeable membrane with X-rays.

[6] The composite semipermeable membrane according to any one of the above [1] to [5], in which the coating layer has a fold structure including a protruding portion and a recessed portion, and a proportion of protruding portions having a height of 100 nm or more among the protruding portions of the fold structure is 80% or more.

[7] A composite semipermeable membrane element including the composite semipermeable membrane according to any one of the above [1] to [6].

Advantageous Effects of Invention

By including the above coating layer, the composite semipermeable membrane of the present invention has fouling resistance easily maintainable before and after contact with an acid, and enables stable operation over a long period of time.

BRIEF DESCRIPTION OF DRAWINGS

FIG. 1 is a cross-sectional diagram schematically illustrating a fold structure of a composite semipermeable membrane.

DESCRIPTION OF EMBODIMENTS

The composite semipermeable membrane of the present invention includes a microporous support layer, a separation functional layer arranged on the microporous support layer, and a coating layer arranged on the separation functional layer. A composite semipermeable membrane includes, as a membrane having a function of removing ions from an aqueous solution, specific examples such as a Reverse Osmosis (RO) membrane and a Nanofiltration (NF) membrane.

Hereinafter, the composite semipermeable membrane of the present invention will be described by way of specific examples.

(1) Support Membrane
(1-1) Substrate

In the present embodiment, the composite semipermeable membrane includes a substrate. A microporous support layer is arranged on the substrate. Hereinafter, the substrate and the microporous support layer on the substrate are collectively called support membrane. However, the substrate is not an essential structure for the composite semipermeable membrane.

Examples of the substrate include a polyester-based polymer, a polyamide-based polymer, a polyolefin-based polymer, mixtures or copolymers thereof, and the like. Among them, a fabric formed of a polyester-based polymer having high mechanical and thermal stability is particularly preferred. As the form of the fabric, a long fiber nonwoven fabric or a short fiber nonwoven fabric, and a woven or knitted fabric can be preferably used.

(1-2) Microporous Support Layer

The microporous support layer does not virtually have performances of separating ions or the like, and exerts the strength to the separation functional layer virtually having separation performances. The size and distribution of pores of the microporous support layer are not particularly limited. For example, the microporous support layer may have uniform and micro pores, and preferred is a microporous support layer which has micropores that gradually increase in size from a surface on a side where the separation functional layer is to be formed to the other surface, and in which the size of the micropores in the surface on the side where the separation functional layer is to be formed is 0.1 nm or more and 100 nm or less.

The materials used for the microporous support layer are not particularly limited. The microporous support layer contains at least one kind of polymer selected from the group consisting of homopolymers such as polysulfones, polyethersulfones, polyamides, polyesters, cellulosic polymers, vinyl polymers, polyphenylene sulfides, polyphenylene sulfide sulfones, polyphenylene sulfones and polyphenylene oxides, and copolymers. Here, examples of the cellulosic polymers include cellulose acetate, cellulose nitrate, and the like, and examples of the vinyl polymers include polyethylene, polypropylene, polyvinyl chloride, polyacrylonitrile, and the like.

The polysulfones are particularly preferred as a material constituting the microporous support layer since the polysulfones have high chemical, mechanical and thermal stability and are easy to mold.

The mass average molecular weight (Mw) of the polysulfones, which is measured by gel permeation chromatography (GPC) using N-methylpyrrolidone as a solvent and polystyrene as a standard substance, is preferably 10,000 or more and 200,000 or less, and more preferably 15,000 or more and 100,000 or less.

When Mw of the polysulfones is 10,000 or more, preferred mechanical strength and heat resistance can be obtained for the porous support layer. In addition, when Mw is 200,000 or less, the viscosity of the solution can be in an appropriate range, and good moldability can be achieved.

The thickness of the substrate and the thickness of the microporous support layer affect the strength of the composite semipermeable membrane and the packing density of the composite semipermeable membrane incorporated into an element. In order to obtain sufficient mechanical strength and packing density, the total thickness of the substrate and porous support layer is preferably 30 µm or more and 300 µm or less, and more preferably 100 µm or more and 220 µm or less. The thickness of the microporous support layer is preferably 20 µm or more and 100 µm or less. In this description, the term "thickness" means an average value unless otherwise noted. The average value herein refers to an arithmetic mean value. That is, each of the thickness of the substrate and the thickness of the porous support layer is determined by examining a cross-section thereof to measure the thickness thereof at 20 points at intervals of 20 µm along a direction (plane direction of the membrane) perpendicular to a thickness direction and calculating an average value of the thicknesses.

(1-3) Method for Forming Support Membrane

For example, an N,N-dimethylformamide (hereinafter, referred to as DMF) solution of the above-mentioned polysulfones is applied onto a polyester fabric or a nonwoven fabric, followed by wet-coagulation in a coagulation bath, to obtain a support layer.

The microporous support layer can also be selected from various commercially available materials such as "Millipore Filter VSWP" (product name) manufactured by Millipore Inc. and "Ultra Filter UK10" (product name) manufactured by Toyo Roshi Kaisha, Ltd., and can be manufactured according to a method described in "Office of Saline Water Research and Development Progress Report" No. 359 (1968).

(2) Separation Functional Layer (2-1) Chemical Structure of Separation Functional Layer The separation functional layer virtually has separation performances. The separation functional layer contains a crosslinked aromatic polyamide. In particular, the separation functional layer preferably contains a crosslinked aromatic polyamide as a main component. The term "main component" refers to a component that accounts for 50 wt % or more of the components of the separation functional layer. When the separation functional layer contains 50 wt % or more of the crosslinked aromatic polyamide, it is possible to exhibit high removal performances. The content of the crosslinked aromatic polyamide in the separation functional layer is preferably 80 wt % or more, and more preferably 90 wt % or more.

The crosslinked aromatic polyamide is a polycondensate of polyfunctional aromatic amines and polyfunctional aromatic acid chlorides. Here, it is preferable that at least one of the polyfunctional aromatic amines and the polyfunctional aromatic acid chlorides contains a compound having three or more functional groups. As a result, a rigid molecular chain is obtained, and a favorable pore structure for removing micro solutes such as hydrated ions and boron is formed.

The polyfunctional aromatic amines refer to aromatic amines which have two or more amino groups, which are at least one of primary amino groups and secondary amino groups, in one molecule, and in which at least one of the amino groups is a primary amino group. Examples of the polyfunctional aromatic amines include polyfunctional aromatic amines in which two amino groups are bonded to an aromatic ring in a positional relationship of any one of a ortho position, a meta position and a para position, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine, polyfunctional aromatic amines such as 1,3, 5-triaminobenzene, 1,2,4-triaminobenzene, 3,5-diaminobenzoic acid, 3-aminobenzylamine, and 4-aminobenzylamine, and the like. In particular, in consideration of the selective separation property, the permeability and the heat resistance of a membrane, m-phenylenediamine, p-phenylenediamine, and 1,3,5-triaminobenzene are preferably used. Among them, it is more preferable to use m-phenylenediamine (hereinafter, also referred to as m-PDA) in view of the easy availability and the easy handling. One of these polyfunctional aromatic amines may be used alone, or two or more thereof may be used in combination.

The polyfunctional aromatic acid chlorides refer to aromatic acid chlorides having at least two chlorocarbonyl groups in one molecule. Examples of trifunctional acid chlorides include trimesic acid chlorides and the like, and examples of bifunctional acid chlorides include biphenyl dicarboxylic acid dichloride, azobenzene dicarboxylic acid dichloride, terephthalic acid chloride, isophthalic acid chloride, naphthalene dicarboxylic acid chloride, and the like. In consideration of the selective separation property and the heat resistance of a membrane, the polyfunctional aromatic acid chlorides are preferably a polyfunctional aromatic acid chloride having 2 to 4 carbonyl chloride groups in one molecule.

(2-2) Method for Forming Separation Functional Layer

The separation functional layer is obtained by forming a crosslinked aromatic polyamide by allowing a polyfunctional aromatic amine and a polyfunctional aromatic acid chloride to chemically react. As a method of chemical reactions, the interfacial polymerization method is most preferred from the viewpoint of productivity and performances. The steps of the interfacial polymerization will be described below.

The steps of the interfacial polymerization include: (a) a step of bringing an aqueous solution containing polyfunctional aromatic amines into contact with a porous support layer; (b) a step of bringing a solution A in which polyfunctional aromatic acid chlorides are dissolved into contact with the porous support layer that has been in contact with the aqueous solution containing the polyfunctional aromatic amines; (c) a step of further bringing an organic-solvent solution B in which polyfunctional aromatic acid chlorides are dissolved into contact with the porous support layer, and heating them; and (d) a step of draining the organic solvent solutions after the reaction.

In this section, a case where a support membrane includes a substrate and a microporous support layer is taken as an example, and in a case where the support membrane has another configuration, the term "microporous support layer" may be replaced with the term "support membrane".

In the step (a), a concentration of the polyfunctional aromatic amines in the aqueous solution containing polyfunctional aromatic amines is preferably within a range of 0.1 wt % or more and 20 wt % or less, and more preferably within a range of 0.5 wt % or more and 15 wt % or less. When the concentration of the polyfunctional aromatic amines is within this range, sufficient solute removal performances and water permeability can be obtained.

The aqueous solution containing the polyfunctional amines may contain a surfactant, an organic solvent, an alkaline compound, an antioxidant, or the like, as long as these ingredients do not inhibit the reaction between the polyfunctional amines and the polyfunctional acid chlorides. The surfactant has the effect of improving the wettability of the surface of the support membrane and reducing interfacial tension between the aqueous solution containing the polyfunctional amines and nonpolar solvents. The organic solvents may act as catalysts for the interfacial polycondensation reaction, and addition thereof sometimes enables an efficient interfacial polycondensation reaction.

It is preferable that the aqueous solution containing polyfunctional aromatic amines is brought into contact with the microporous support layer evenly and continuously. Specific examples of the contact method include a method in which the aqueous solution containing polyfunctional aromatic amines is applied to the microporous support layer by coating, a method in which the microporous support layer is immersed in the aqueous solution containing polyfunctional aromatic amines, and the like. The time period during which the microporous support layer is in contact with the aqueous solution containing polyfunctional aromatic amines is preferably 1 second or more and 10 minutes or less, and more preferably 10 seconds or more and 3 minutes or less.

After the contact of the aqueous solution containing polyfunctional aromatic amines with the microporous support layer, the solution is sufficiently drained not to allow droplets to remain on the membrane. If the solution is sufficiently drained, it is possible to prevent a decrease in the removal performance due to the fact that the remaining portion of the droplets becomes a membrane defect after formation of the microporous support layer. Examples of a method for the solution-draining include: a method in which the support membrane which has been contacted with the aqueous solution containing polyfunctional aromatic amines is held vertically to allow the excess aqueous solution to flow down naturally, as described in JP-A-2-78428; a method in which an airflow such as nitrogen is blown from an air nozzle to forcedly drain the solution; and the like. After the solution-draining, the membrane surface may be dried to remove some of the water contained in the aqueous solution.

The concentration of the polyfunctional aromatic acid chlorides in the organic-solvent solutions (the solution A and the solution B) is preferably within a range of 0.01 wt % or more and 10 wt % or less, and more preferably within a range of 0.02 wt % or more and 2.0 wt % or less. By setting the concentration thereof to 0.01 wt % or more, a sufficient reaction rate is obtained, and by setting the concentration thereof to 10 wt % or less, the occurrence of side reactions can be inhibited.

The organic solvent is preferably a water-immiscible organic solvent which dissolves the polyfunctional aromatic acid chlorides and does not damage the support membrane. Any such organic solvent, which is inert to the polyfunctional aromatic amines and the polyfunctional aromatic acid chlorides, may be used. Preferred examples thereof include hydrocarbon compounds such as n-nonane, n-decane, n-undecane, n-dodecane, isooctane, isodecane, and isododecane, and mixed solvents thereof.

A method for contacting the organic-solvent solution of the polyfunctional aromatic acid chlorides with the microporous support layer that has been in contact with the aqueous solution containing polyfunctional aromatic amines may be performed in the same manner as a method of coating the microporous support layer with the aqueous solution containing polyfunctional aromatic amines.

In the step (c), the solution B in which polyfunctional aromatic acid chlorides are dissolved is brought into contact with the porous support layer, followed by heating. The temperature at which the heat treatment is performed is 50° C. or higher and 180° C. or lower, and preferably 60° C. or higher and 160° C. or lower. By performing heating within this range, synergistic effects of promoting the interfacial polymerization reaction by the heat and the concentration of the solution can be obtained.

In the step (d), the organic solvent is removed by draining the organic-solvent solution after the reaction. Examples of methods for removal of the organic solvent include a method in which the membrane is held vertically to allow the excess organic solvent to flow down naturally so as to be removed, a method for drying and removing the organic solvent by blowing air with a blower, a method for removing the excess organic solvent by a mixed fluid of water and air, and the like.

(3) Coating Layer

The composite semipermeable membrane includes a coating layer on the surface. The coating layer virtually has a function of inhibiting adhesion of the foulant.

(3-1) Composition of Coating Layer

The coating layer contains an aliphatic polymer having a structure represented by the formula (I).

[Chem. 4]

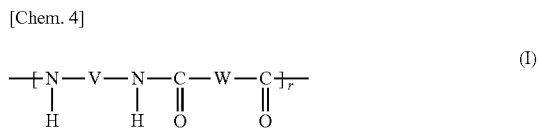

(Here, V is at least one structure selected from the structure group (i), W is at least one structure selected from the structure group (ii), and r is an integer of 2 or more.)

[Chem. 5]

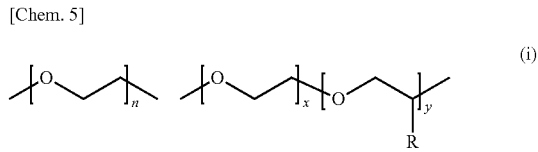

(Here, n is an integer of 1 or more and 100 or less, x and y are an integer of 1 or more and 50 or less, and R refers to a methyl group.)

[Chem. 6]

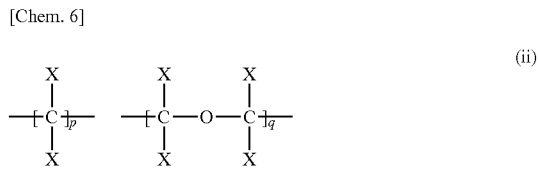

(Here, X represents a hydrogen atom or a fluorine atom, and a part or all of X is a fluorine atom. p and q are an integer of 1 or more and 10 or less.)

The structure group (i) is referred to as a polyether moiety, and the structure group (ii) is referred to as a fluorine moiety.

When the aliphatic polymer contains a polyether moiety, the amount and motility of water contained in the coating layer can be controlled. As a result, the coating layer can prevent adhesion of foulant to the composite semipermeable membrane, and can prevent a decrease in the amount of water produced. The polyether moiety is preferably a unit containing a structure represented by —O—CH$_2$—CH$_2$— or —O—CH(CH$_3$)—CH$_2$— from the viewpoint of controlling the amount and the motility of water. The polyether moiety may be linear or branched. Namely, the polyether moiety is preferably a linear or branched polymer containing a polyalkylene oxide moiety, especially a polyethylene glycol or a polypropylene glycol moiety.

When the aliphatic polymer has a fluorine moiety, it is possible to control the motility and surface energy of water contained in the coating layer. As a result, the coating layer can prevent adhesion of foulant, and can prevent a decrease in the amount of water produced. The fluorine moiety is a unit having 1 to 20 carbon atoms, which contains a functional group having a structure represented by —$CF_2$— or —$CF_3$—. It is preferred since both an appropriate affinity for water and antifouling properties can be achieved when the fluorine moiety contains an ether group such as $CF_3$—O—$CF_2$—, —$CF_2$—O—$CF_2$—, and $CF_2$—$CH_2$—O—, or a hydroxy group.

As shown in the formula (I), the polymer forming the coating layer contains an amide group as a linker between a polyether moiety and a fluorine moiety. The amide group maintains moderate hydrophilicity and contributes to controlling the amount of water contained in the coating layer. In addition, the amide group is relatively stable among various linkers, and can ensure good chemical resistance (acid resistance) at the same time.

As shown in the formula (I), the polymer forming the coating layer is a structure in which a polyether moiety and a fluorine moiety are arranged alternately with an amide bond interposed therebetween, and are repeated for a plurality of times. The structure in which the polyether moiety and the fluorine moiety are repeated alternately for a plurality of times can exhibit higher antifouling properties, as compared with a simple structure in which the polyether moiety and the fluorine moiety are not repeated. It is preferred since the chemical resistance (acid resistance) is improved because even under strong hydrolysis conditions, there is a high probability that a fluorine moiety or a polyether moiety remains on the membrane surface to maintain antifouling properties by having the structure in which the polyether moiety and the fluorine moiety are repeated for a plurality of times. The ratio between the polyether moiety and the fluorine moiety can be appropriately adjusted.

In the formula (I), since "V is at least one structure selected from the structure group (i), and W is at least one structure selected from the structure group (ii)", the aliphatic polymer may contain a plurality of kinds of polyether moieties V and a plurality of kinds of fluorine moieties W. For example, a polyether moiety V1 having a certain structure, a fluorine moiety W1 having a certain structure, a polyether moiety V2 having a structure different from V1, and a fluorine moiety W2 having a structure different from W2 may be coupled.

(3-2) Method for Forming Coating Layer

The coating layer is formed on a surface of the separation functional layer. The coating layer may be formed by applying the polymer forming the coating layer to the separation functional layer, or the coating layer may be formed by immersing a membrane containing the separation functional layer to a solution containing the polymer forming the coating layer. In addition, the coating layer may be formed by allowing a substance as a raw material of the polymer forming the coating layer to react on the surface of the separation functional layer. Further, the coating layer may be formed by passing-through treatment with a solution of the polymer forming the coating layer after producing a composite semipermeable membrane element described below.

The aliphatic polymer contained in the coating layer can be obtained by the condensation of a compound having a polyether moiety and a terminal functional group with a compound having a fluorine moiety and a terminal functional group. Here, a functional group, which can form an amide bond, is selected as the terminal functional group. Namely, each of the compound containing a polyether moiety and the compound containing a fluorine moiety preferably has either or both of an amino group and a carboxy group or a functional group derived from a carboxylic acid (acid chlorides, acid fluorides, or the like).

As the polyether having an amino group, commercially available compounds can be utilized, and examples thereof include JEFFAMINE (registered trademark) Diamines (D, ED, EDR series), JEFFAMINE (registered trademark) Triamines (T series), which are manufactured by Huntsman, and the like.

Examples of the fluorine compound having the functional group derived from a carboxylic acid include perfluoroalkanoyl fluoride, perfluorosuccinoyl fluoride, hexafluoroglutaryl fluoride, octafluoroadipoyl fluoride, perfluoropolyether diacrylic fluoride, perfluoroalkanoic acid, perfluorosuccinic acid, perfluoroglutaric acid, perfluoroadipic acid, perfluoroalkane geoic acid, perfluoro-3,6-dioxaoctane-1,8-dioic acid, perfluoro-3,6,9-trioxaundecane-1,11-dioic acid, and the like.

The polyethers may have a carboxy group or a functional group derived from a carboxylic acid, and the fluorine compound may have an amino group.

When a moiety having an amino group and a carboxy group or a functional group derived from a carboxylic acid are condensed in the form of an amide group to form a polymer, a condensation reaction between an acid chloride or an acid fluoride having high reactivity, which is derived from carboxylic acid, and an amino group may be utilized, and a carboxy group and an amino group may be condensed by using a condensation accelerator. Examples of the condensation accelerator include sulfuric acid, 4-(4,6-dimethoxy-1,3,5-triazin-2-yl)-4-methylmorpholinium chloride (DMT-MM), 1-(3-dimethylaminopropyl)-3-ethylcarbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 1H-benzotriazol-1-yloxytris(dimethylamino)phosphonium hexafluorophosphate, (7-azabenzotriazol-1-yloxy)tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, O—(N-succinimidyl)-N,N,N',N'-tetramethyluronium tetrafluoroborate, O—(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, (4,6-dimethoxy-1,3,5-triazin-2-yl)-(2-octoxy-2-oxoethyl)dimethylammonium trifluoromethanesulfonate, S-(1-oxide-2-pyridyl)-N,N,N',N'-tetramethylthiuronium tetrafluoroborate, O-[2-oxo-1(2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene)pyrrolidinium hexafluorophosphate, 2-fluoro-1,3-dimethylimidazolinium hexafluorophosphate, fluoro-N,N,N',N'-tetramethylformamidinium hexafluorophosphate, and the like.

The reaction time and concentration of the synthesis of the polymer for forming the coating layer can be appropriately adjusted depending on the solvent, the condensing agent, and chemical structures of the compound used, and from the viewpoint of the productivity, the reaction time is preferably 24 hours or less, more preferably 12 hours or less, still more preferably 6 hours or less, and particularly preferably 1 hour or less. After completion of the reaction, the residue compound may be removed and the product may be purified.

(3-3) Chemical Bonds Between Coating Layer and Separation Functional Layer

The aliphatic polymer in the coating layer and the crosslinked aromatic polyamide in the separation functional layer may be linked to each other by chemical bonds. When chemical bonds are formed between the aliphatic polymer and the crosslinked aromatic polyamide, the coating layer can exist more stably. The chemical bonds are preferably a covalent bond, and are particularly preferably an amide bond from the viewpoints of using a functional group possessed by a polymer constituting each layer and maintaining the chemical durability at a high level.

Specifically, the amide bond is formed between an amino group of the aliphatic polymer forming the coating layer and a carboxy group of the crosslinked aromatic polyamide forming the separation functional layer, or may be formed between a carboxy group of the aliphatic polymer and an amino group of the crosslinked aromatic polyamide.

The formation of the amide bond may be performed in a state where the crosslinked aromatic polyamide constituting the separation functional layer is in contact with the above aliphatic polymer. Specifically, a chemical reaction may be performed between the aliphatic polymer in the solution and the separation functional layer after or while applying the solution containing the pre-synthesized polymer onto the separation functional layer by coating. Alternatively, the chemical reaction may be performed between the aliphatic polymer and the separation functional layer after immersing the membrane containing the separation functional layer into the solution containing the pre-synthesized polymer, or in a state where the membrane is immersed in the solution. Further, the chemical reaction may be performed between the coating layer and the separation functional layer when the coating layer is formed by passing-through treatment with the solution containing the polymer after producing the composite semipermeable membrane element described below. Alternatively, when the polymer to be the coating layer is formed by reacting directly on the surface of the separation functional layer, the polymer may form amide bonds with the crosslinked aromatic polyamide forming the separation functional layer at the same time. During the formation of amide bonds between the coating layer and the separation functional layer, the carboxy group is preferably in a state of having a high reaction activity as necessary. For example, a reaction between a chlorocarbonyl group possessed by the crosslinked aromatic polyamide and an amino group possessed by the above aliphatic polymer immediately after the interfacial polymerization may be utilized, or various reaction aids (condensation accelerators) are preferably used for forming amide bonds in a high efficiency and in a short time. As the condensation accelerator, the same compounds as those exemplified in the condensation for forming the aliphatic polymer can be preferably used.

In order to obtain high hydrophilicity, the aliphatic polymer contained in the coating layer preferably has a carboxy group or an amino group, and more preferably has a carboxy group, as a terminal functional group, that is, as a functional group that is not bonded to the separation functional layer.

The reaction time and the concentration of the formation of amide bonds between the coating layer and the separation functional layer can be appropriately adjusted depending on the solvent, the condensing agent, and chemical structures of the polymer used, and from the viewpoint of the productivity and the thickness of the coating layer to be formed, the reaction time is preferably 24 hours or less, more preferably 1 hour or less, and still more preferably 10 minutes or less. After the completion of the reaction, it is preferable that the obtained composite semipermeable membrane is cleaned with water, hot water or a suitable organic solvent to remove reactive compounds.

(3-4) Physical Properties of Coating Layer

As a result of intensive studies, the present inventors have found that a state of water contained in the coating layer affects the fouling resistance. Specifically, it has been found that the effect of preventing the adhesion of foulant is enhanced and a decrease in the amount of water produced before and after the fouling resistance test is reduced when intensity of the maximum peak between 3700 $cm^{-1}$ and 2900 $cm^{-1}$, which represents the stretching vibration of the O—H bond of a water molecule, is 0.08 or more in a difference spectrum which is obtained by subtracting, from an infrared absorption spectrum (IR spectrum) measured from a coating layer side of a composite semipermeable membrane equilibrated at a temperature of 25° C. and a relative humidity of 97%, an IR spectrum measured from the coating layer side of the composite semipermeable membrane equilibrated at a temperature of 25° C. and a relative humidity of 3%, and the peak top wave number between 3700 $cm^{-1}$ and 2900 $cm^{-1}$, which represents the stretching vibration of the O—H bond of a water molecule, is 3400 $cm^{-1}$ or more and 3550 $cm^{-1}$ or less in a difference spectrum which is obtained by subtracting, from an IR spectrum measured from a coating layer side of a composite semipermeable membrane equilibrated at a temperature of 25° C. and a relative humidity of 97%, an IR spectrum measured from the coating layer side of the composite semipermeable membrane equilibrated at a temperature of 25° C. and a relative humidity of 3%. As a method for adjusting a relative humidity at a constant temperature, a saturated salt method described in JIS B 7920 can be used. The IR spectrum of a laminated semipermeable membrane can be measured by Attenuated Total Reflectance (ATR) infrared spectroscopy.

As a result of intensive studies, the present inventors have found that, as for the composite semipermeable membrane of the present invention, the effect of preventing the adhesion of foulant is enhanced and a decrease in the amount of water produced before and after the fouling resistance test is reduced in a case where the peak of positive secondary ions satisfies the following formula (1) when a coating layer side of the composite semipermeable membrane is measured by using time-of-flight secondary ion mass spectrometry.

The count numbers in the cases of m/z of positive secondary ions=45.03, 59.05, 104.03, 108.07, 135.06 are set as a, b, c, d, e, respectively.

$$a+b \geq 10 \times (c+d+e) \tag{1}$$

In the cases of m/z of positive secondary ions=45.03, 59.05, the positive secondary ions are attributed to ions ($C_2H_5O^+$, $C_3H_7O^+$) derived from polyalkylene oxide moieties contained in the structure group (i), and in the cases of m/z of positive secondary ions=104.03, 108.07, 135.06, the positive secondary ions are attributed to ions ($C_7H_4O^+$, $C_6H_8N_2^+$, $C_7H_7N_2O^+$) derived from partial structures of aromatic polyamides.

In the X-ray photoelectron spectroscopy measurement performed by irradiating the surface on the coating layer side of the composite semipermeable membrane of the present invention with X-rays, it is preferable that the peak of C1s has one or more maximum values within a range of 290 eV or more and 295 eV or less, and the limit depth from the coating layer side, at which at least one maximum value of the peak of C1s is detected within the range of 290 eV or more and 295 eV or less, is 10 nm or less. When the limit depth is 10 nm or less, a sufficient amount of water produced can be ensured without causing the decrease in the water permeability due to the coating layer. These values correspond to the presence of moieties containing fluorine atoms and the thickness thereof.

(4) Shapes of Membrane Surface

As a result of intensive studies, the present inventors have found that high water permeability is exhibited when the proportion of protruding portions which have a height of 100 nm or more, of the membrane surface is 80% or more.

The protruding portion of the membrane surface in the present invention refers to a protruding portion having a height that is ⅕ or more of a ten-point average surface roughness. The ten-point average surface roughness is a value obtained by the following calculation method. First, a cross section in a direction perpendicular to a membrane surface is observed by an electron microscope at the following magnification. In the obtained cross-sectional image, a surface of the separation functional layer (indicated by the symbol "1" in FIG. 1) appears as a curve of a fold structure in which protruding portions and recessed portions are continuously repeated. As for this curve, a roughness curve defined based on ISO 4287:1997 is determined. A cross-sectional image is extracted with a width of 2.0 μm in a direction of an average line of the above roughness curve (FIG. 1).

The average line is a straight line defined based on ISO 4287:1997 and is a straight line which is drawn such that the total areas of the regions enclosed by the average line and the roughness curve, at the measurement length, are equal above and below the average line.

In the image extracted with a width of 2.0 μm, the height of protruding portions and the depth of recessed portions are respectively measured with the above average line as a baseline. An average value is calculated for absolute values of heights H1 to H5 of five protruding portions from the highest protruding portion to a protruding portion having the fifth height with the heights decreasing gradually, and an average value is calculated for absolute values of depths D1 to D5 of five recessed portions from the deepest recessed portion to a recessed portion having the fifth depth with the depths decreasing gradually. Further, a sum of absolute values of the two obtained average values is calculated. The thus-obtained sum is a ten-point average surface roughness.

The heights of the protruding portions can be measured by a transmission electron microscope. First, a sample is embedded with a water-soluble polymer to prepare ultra-thin sections for the transmission electron microscope (TEM). Any polymer can be used as the water-soluble polymer as long as it can retain a shape of the sample, and for example, PVA or the like can be used. Next, in order to facilitate the observation of cross sections, the sample is stained with $OsO_4$ and is cut by an ultra-microtome to prepare ultra-thin sections. A cross-sectional photograph of the obtained ultra-thin sections is captured by using TEM.

The cross-sectional photograph is read into image analysis software to analyze the heights of the protruding portions. In this case, the heights of the protruding portions are a value measured for protruding portions having a height that is ⅕ or more of the ten-point average surface roughness. The heights of the protruding portions are measured as follows. When any 10 cross sections are observed in the composite semipermeable membrane, the height of the protruding portion, which is ⅕ or more of the ten-point average surface roughness described above, is measured in each cross section. Here, each cross section has a width of 2.0 μm in the direction of the average line of the above roughness curve.

The height of the protruding portion affects a surface area of the membrane. The proportion of protruding portions which have a height of 100 nm or more, of the separation functional layer in the present invention is 80% or more, so that high water permeability can be obtained. The proportion of protruding portions having a height of 100 nm or more is more preferably 84% or more.

(5) Utilization of Composite Semipermeable Membranes

The composite semipermeable membrane is preferably used as a spiral composite semipermeable membrane element which is wound around a cylindrical water collection pipe, which is provided with a large number of pores, together with a feed water flow path material such as a plastic net, a permeated water flow path material such as a tricot, and a film for increasing the pressure resistance as required. Further, the elements may be connected in series or in parallel to form a composite semipermeable membrane module housed in a pressure vessel.

The above composite semipermeable membrane, or the element thereof or the module may be combined with a pump for supplying feed water to the composite semipermeable membrane, the element thereof or the module, and with a device for pre-treating the feed water to constitute a fluid separation device. The separation device is used so that the feed water is separated into permeated water, such as drinking water, and concentrated water, which does not permeate the membrane, so as to obtain water for interest.

Examples of the feed water to be treated by the composite semipermeable membrane according to the present invention include liquid mixtures containing total dissolved solids (TDS) of 500 mg/L or more and 100 g/L or less, such as seawater, brine, and wastewater. In general, TDS refers to a content of total dissolved solids and is represented by "mass÷volume" or "weight ratio". According to the definition, the TDS value can be calculated from a weight of residues obtained by evaporating the solution, having been filtered by a 0.45 micron filter, at a temperature of 39.5° C. or higher and 40.5° C. or lower, but is converted from practical salt (S) more conveniently.

The operation pressure when water to be treated permeates the composite semipermeable membrane is preferably 0.5 MPa or more and 10 MPa or less in consideration of the durability of the composite semipermeable membrane and the fact that the energy required for operation also increases although the solute removal rate improves when the operation pressure of the fluid separation device is high. The temperature of the feed water is preferably 5° C. or higher and 45° C. or lower since the solute removal rate decreases when the temperature increases and a membrane permeation flux also decreases when the temperature decreases. In addition, operation in a neutral range is preferred since a scale of magnesium or the like may be generated in the case of feed water having a high solute concentration such as seawater when the pH of the feed water is increased, and there is concern about deterioration of the membrane due to high pH operation.

EXAMPLES

The present invention will be described in more detail with reference to Examples.

However, the present invention is not limited in any way.

(1) Preparation of Membrane

Reference Example 1

A 16.0 mass % DMF solution of polysulfone (PSf) was cast with a thickness of 200 µm at a condition of 25° C. onto a polyester nonwoven fabric (air permeability: 2.0 cc/cm$^2$/sec), followed by immediately immersing in pure water and allowing to stand for five minutes, and a porous support membrane was prepared.

The obtained porous support membrane was immersed in a 3 mass % aqueous solution of m-phenylenediamine (m-PDA) for two minutes and then was slowly pulled up in the vertical direction, and nitrogen was blown from an air nozzle to remove excess aqueous solution from a surface of the support membrane. Then, in the environment controlled at room temperature of 40° C., a decane solution having a temperature of 40° C. and containing 0.165 mass % of trimesic acid chloride (TMC) was applied to the porous support membrane such that the surface of the porous support membrane was completely wet, the porous support membrane was allowed to stand for one minute, followed by holding the membrane vertically to drain and remove the excess solution, and heating and drying for one minute at 80° C., and a composite semipermeable membrane having a crosslinked aromatic polyamide separation functional layer was obtained.

Reference Example 2

A 16.0 mass % DMF solution of polysulfone (PSf) was cast with a thickness of 200 µm at a condition of 25° C. onto a polyester nonwoven fabric (air permeability: 2.0 cc/cm$^2$/sec), followed by immediately immersing in pure water and allowing to stand for five minutes, and a porous support membrane was prepared.

The obtained porous support membrane was immersed in a 3 mass % aqueous solution of m-phenylenediamine (m-PDA) for two minutes and then was slowly pulled up in the vertical direction, and nitrogen was blown from an air nozzle to remove excess aqueous solution from a surface of the support membrane. Then, in the environment controlled at room temperature of 25° C., a decane solution having a temperature of 25° C. and containing 0.165 mass % of trimesic acid chloride (TMC) was applied to the porous support membrane such that the surface of the porous support membrane was completely wet, the porous support membrane was allowed to stand for one minute, followed by holding the membrane vertically to drain and remove the excess solution, and heating and drying for one minute at 80° C., and a composite semipermeable membrane having a crosslinked aromatic polyamide separation functional layer was obtained.

Examples 1 to 3

A compound shown in Table 1 was dissolved in pure water at a concentration shown in Table 1, then 4-(4,6-dimethoxy-1,3,5-triazin-2-yl)-4-methylmorpholinium chloride was dissolved in the obtained solution as a condensing agent to reach a concentration of 1%, followed by performing stirring for 24 hours at 25° C., and a polymer solution was prepared. The polymer solution was collected and purified by gel permeation chromatography to remove components having a molecular weight (in terms of dextran) of 5,000 or less. The obtained polymer was dissolved in pure water to reach a concentration of 4000 ppm, and further the above condensing agent was dissolved therein to reach a concentration of 1000 ppm. Then, the solution was applied to a surface on a separation functional layer side of the composite semipermeable membrane having the crosslinked aromatic polyamide separation functional layer, which was obtained in Reference Example 1, the composite semipermeable membrane was allowed to stand for 10 minutes at 25° C., followed by performing washing with pure water, and a composite semipermeable membrane having a coating layer was prepared.

Example 4

A composite semipermeable membrane was prepared by the same method as Example 1 except that a condensing agent was not added in the step before the coating of the composite semipermeable membrane.

Example 5

The polymer purified in Example 1, perfluor-3,6-dioxaoctane-1,8-dioic acid, a condensing agent described in Example 1 were dissolved in pure water to reach a concentration of 0.1%, 1%, and 1% respectively, and the mixture was stirred for one hour at 25° C. The obtained polymer was purified, and it was confirmed that the terminal of the amino group was not detected by using $^1$H NMR. The polymer was dissolved in pure water to reach a concentration of 4000 ppm, and the above condensing agent was dissolved therein to reach a concentration of 1000 ppm. Then, the solution was applied to a surface on a separation functional layer side of the composite semipermeable membrane having the crosslinked aromatic polyamide separation functional layer, which was obtained in Reference Example 1, the composite semipermeable membrane was allowed to stand for 10 minutes at 25° C., followed by performing washing with pure water, and a composite semipermeable membrane having a coating layer was prepared.

Example 6

A composite semipermeable membrane was prepared by the same method as Example 1 except that the standing time after coating was changed to one hour.

Example 7

A composite semipermeable membrane was prepared by the same method as Example 1 except that the composite semipermeable membrane to be coated with the polymer solution was prepared by the method of Reference Example 2.

TABLE 1

| Examples | Compound 1 Chemical formula | Concentration (wt%) | Compound 2 Chemical formula | Concentration (wt%) |
|---|---|---|---|---|
| 1 | H$_2$N–[CH(CH$_3$)CH$_2$–O]$_x$–[CH$_2$CH(CH$_3$)–O]$_y$–[CH$_2$CH(CH$_3$)]$_z$–NH$_2$<br>x + z ≈ 6, y ≈ 39 | 3 | HOOC–CF$_2$CF$_2$CF$_2$CF$_2$–COOH | 1 |
| 2 | H$_2$N–[CH(CH$_3$)CH$_2$–O]$_x$–[CH$_2$CH(CH$_3$)–O]$_y$–[CH$_2$CH(CH$_3$)]$_z$–NH$_2$<br>x + z ≈ 6, y ≈ 39 | 3 | HOOC–CF$_2$–O–CF$_2$CF$_2$–O–CF$_2$–COOH | 1 |
| 3 | H$_2$N–[CH(CH$_3$)CH$_2$–O]$_x$–[CH$_2$CH(CH$_3$)–O]$_y$–[CH$_2$CH(CH$_3$)]$_z$–NH$_2$<br>x + z ≈ 6, y ≈ 13 | 3 | HOOC–CF$_2$–O–CF$_2$CF$_2$–O–CF$_2$–COOH | 1 |

Comparative Examples 1 to 5

A compound shown in Table 2 was dissolved in pure water at a concentration shown in Table 2, followed by performing stirring for five minutes at 25° C., and a polymer solution was prepared. The obtained polymer solution was not purified particularly and was applied to a surface on a separation functional layer side of the composite semipermeable membrane having the crosslinked aromatic polyamide separation functional layer, which was obtained in Reference Example 1, the composite semipermeable membrane was allowed to stand for 10 minutes at 25° C., followed by performing washing with pure water, and a composite semipermeable membrane having a coating layer was prepared.

TABLE 2

| Comparative Examples | Compound 1 | | Compound 2 | | Compound 3 | |
|---|---|---|---|---|---|---|
| | Chemical formula | Concentration (ppm) | Chemical formula | Concentration (ppm) | Chemical formula | Concentration (ppm) |
| 1 | H₂N-CH(CH₃)-[O-CH₂-CH(CH₃)]ₓ-[O-CH₂-CH₂]ᵧ-[O-CH₂-CH(CH₃)]_z-NH₂, x+z ≈ 6, y ≈ 39 | 5000 | Perfluorinated compound with carbonyl | 2000 | Epoxy-terminated PEG, x ≈ 10 | 5000 |
| 2 | H₂N-CH(CH₃)-[O-CH₂-CH(CH₃)]ₓ-[O-CH₂-CH₂]ᵧ-[O-CH₂-CH(CH₃)]_z-NH₂, x+z ≈ 6, y ≈ 39 | 5000 | Fluorinated glycidyl ether | 300 | Epoxy-terminated PEG, x ≈ 10 | 5000 |
| 3 | Epoxy-terminated PEG, x ≈ 80 | 10000 | | | | |
| 4 | H₂N-CH(CH₃)-[O-CH₂-CH(CH₃)]ₓ-[O-CH₂-CH₂]ᵧ-[O-CH₂-CH(CH₃)]_z-NH₂, x+z ≈ 6, y ≈ 39 | 3000 | Perfluorinated carboxylic acid | 1000 | | |
| 5 | Perfluorinated carboxylic acid | 10000 | | | | |

(2) IR Measurement (Equilibration of Composite Semipermeable Membrane Under Conditions of Constant Temperature and Relative Humidity)

The relative humidity of the air in equilibrium with a saturated aqueous solution of a salt depends on the kind of the salt and the temperature of the solution. Thus, by keeping a vessel, in which the saturated aqueous solution of the salt is placed, at a constant temperature, it is possible to create an equilibrium state and generate a predetermined relative humidity. The method for adjusting the relative humidity in this manner is referred to as a saturated salt method and is also described in JIS B 7920.

In this test, the relative humidity was adjusted by using the saturated salt method to equilibrate the composite semipermeable membrane. Specifically, about 200 mL of a saturated salt solution was placed in a vessel having a capacity of 2.7 L, a membrane having been soaked in water (area: about 2 cm$^2$) was placed in the vessel in a wet state and was not in contact with the saturated salt solution, followed by sealing the vessel, and the vessel was allowed to stand for 30 days in an incubator at 25° C.

(Infrared Absorption Spectrum (IR Spectrum))

The IR spectrum was measured by Attenuated Total Reflectance (ATR) infrared spectroscopy. Avatar 360 FT-IR measurement machine manufactured by Nicolet Co., Ltd. was used as a measurement machine, and a single reflection horizontal ATR measurement device (OMNI-Sampler) manufactured by the same corporation, and an ATR crystal made of germanium were used as accessories for measuring the total internal reflection, so as to measure a surface of a sample. As measurement conditions, the resolution was set to 4 cm$^{-1}$ and the number of scans was set to 256 times. Measurement was performed immediately after obtaining the composite semipermeable membrane equilibrated under the above conditions. The obtained spectrum was represented by absorbance, and was subjected to autobased-line correction.

(3) Time-of-Flight Secondary Ion Mass Spectrometry Measurement

A composite semipermeable membrane obtained in the examples of the above item (1) was dried at room temperature under vacuum and was subjected to the time-of-flight secondary ion mass spectrometry measurement by using TOF SIMS 5 device (manufactured by ION TOF) (secondary ion polarity: positive, mass range (m/z)=0 to 200, raster size: 300 μm, number of scans: 16, number of pixels (one side)=256, measurement vacuum degree=$4 \times 10^{-7}$ Pa or less, primary ion species: $Bi^{3++}$, primary ion acceleration voltage=25 kV, pulse width=12.5, 13.3 ns, bunching: yes, charge neutralization: yes, late acceleration: 10 kV). For the surface on the coating layer side of the composite semipermeable membrane, the count numbers in the cases of m/z of positive secondary ions=45.03, 59.05, 104.03, 108.07, 135.06 were determined respectively, and the count numbers in the cases of m/z of positive secondary ions=45.03, 59.05, 104.03, 108.07, 135.06 were respectively set as a, b, c, d, e to determine the value of (a+b)/(c+d+e).

(4) X-Ray Photoelectron Spectroscopy Measurement

A composite semipermeable membrane obtained in the above item (1) was dried at room temperature under vacuum and was measured using an X-ray photoelectron spectrometer SSX-100 manufactured by SSI, USA at conditions of aluminum Kα1 ray and Kα2 ray as excitation X-rays (1486.6 eV), X-ray output of 10 kV 20 mV, and a photoelectron escape angle of 35°, thereby confirming whether the peak of C1s had a maximum value within a range of 290 eV or more and 295 eV or less. In addition, as depth direction analysis from the coating layer surface, an angle-resolved XPS method was used and a tilt angle of a sample was changed from 0° to about 90°, thereby determining a limit depth at which the above peak of C1s was observed.

(5) Height of Protruding Portions

A composite semipermeable membrane containing a coating layer was embedded with PVA, stained with $OsO_4$, and cut by an ultra-microtome to prepare ultra-thin sections. Cross-sectional photographs of the obtained ultra-thin sections were captured by using a transmission electron microscope. The cross-sectional photographs captured by the transmission electron microscope were read into image analysis software, a height of a protruding portion and a depth of a recessed portion in a distance of a length of 2.0 μm were measured, and the ten-point average surface roughness was calculated as described above. Based on the ten-point average surface roughness, a height of protruding portions having a height of ⅕ or more of the ten-point average surface roughness was measured. The above measurement was repeated until the height of the protruding portions exceeded 100 points, and a proportion of protruding portions having a height of 100 nm or more among the above protruding portions was determined.

(6) Performance Evaluation of Composite Semipermeable Membrane

Seawater (Total Dissolved Solids (TDS) concentration: 3.5%), which was adjusted to have a temperature of 25° C. and a pH of 7, was supplied at operation pressure of 5.5 MPa to the obtained composite semipermeable membrane so as to perform a membrane water flow test, and performances at the time of manufacturing were determined.

The salt removal rate was calculated from the following formula.

$$\text{Salt removal rate (\%)}=100 \times \{1-(\text{TDS concentration in permeated water/TDS concentration in feed water})\}$$

The permeate flow rate (m$^3$/m$^2$/day) was determined from the permeate flow rate (cubic meter) per day per square meter of membrane surface, which was obtained under the above conditions.

(7) Fouling Resistance Test

After the evaluation of the performances during the manufacturing in the above item (6), dry milk was added to seawater to reach a concentration of 100 ppm, and the seawater passed through the composite semipermeable membrane for one hour at a temperature of 25° C. and operation pressure of 5.5 MPa. Then, a permeate flow rate was measured, and a ratio of the permeate flow rate to the permeate flow rate at the time of the manufacturing was calculated.

(Fouling Resistance Test after Contact with Acid)

A composite semipermeable membrane obtained in the above item (1) was immersed in pure water of 25° C., adjusted to have a pH of 2, for 24 hours, and then was washed with pure water having a pH of 7. A permeate flow rate (m$^3$/m$^2$/day) thereof was determined in the same procedure as the above item (6). Then, dry milk was added to seawater to reach a concentration of 100 ppm, and the seawater passed through the composite semipermeable membrane for one hour at a temperature of 25° C. and operation pressure of 5.5 MPa. A permeate flow rate was then measured, and a ratio thereof to the permeate flow rate before adding the dry milk was calculated.

(Fouling Resistance Test after SBS Solution Storage)

A composite semipermeable membrane obtained in the above item (1) was immersed in an aqueous solution of 25° C., in which sodium bisulfite (SBS) was dissolved to reach a concentration of 1,000 ppm, for 24 hours, and then was washed with pure water having a pH of 7. A permeate flow rate ($m^3/m^2/day$) thereof was determined in the same procedure as the above item (6). Then, dry milk was added to seawater to reach a concentration of 100 ppm, and the seawater passed through the composite semipermeable membrane for one hour at a temperature of 25° C. and operation pressure of 5.5 MPa. A permeate flow rate was then measured, and a ratio thereof to the permeate flow rate before adding the dry milk was calculated.

The membrane performances and fouling resistance evaluation results of the composite semipermeable membranes obtained in Examples and Comparative Examples are shown in Table 3. As shown in the Examples, it can be seen that the composite semipermeable membrane of the present invention achieves both the fouling resistance and the high water permeability, and is also excellent in the stability of fouling resistance after contact with an acid and after the SBS solution storage.

Patent Application (No. 2018-34859) filed on Feb. 28, 2018, the contents of which are incorporated herein by reference.

The invention claimed is:

1. A composite semipermeable membrane comprising: a microporous support layer;
a separation functional layer arranged on the microporous support layer; and
a coating layer arranged on the separation functional layer,
wherein the separation functional layer comprises a crosslinked aromatic polyamide which is a polycondensate of a polyfunctional aromatic amine and a polyfunctional aromatic a chloride, and
the coating layer comprises an aliphatic polymer having a structure represented by the following formula (I):

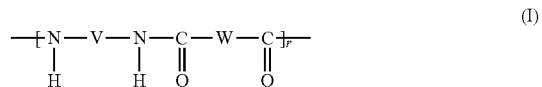

TABLE 3

| | | IR measurement | | X-ray photoelectron spectroscopy measurement Limit depth at which maximum value occur | Time-of-flight secondary iom mass spectroscopy | Protruding portions Proportion of protruding | Performances at the time of manufacturing | | Results of fouling resistance test (dry milk) Retention | Results of fouling resistance test after contact with acid Retention | Results of fouling resistance test after SBS solution storage Retention |
|---|---|---|---|---|---|---|---|---|---|---|---|
| | | Intensity of maximum peak (—) | Peak top wave number ($cm^{-1}$) | within range of 290 eV to 295 eV (nm) | measurement Values of (a + b)/(c + d + e) (—) | portions of 100 nm or more (%) | Permeate flow rate ($m^3/m^2/day$) | Salt removal rate (%) | rate of permeate flow rate (—) | rate of permeate flow rate (—) | rate of permeate flow rate (—) |
| Example | 1 | 0.15 | 3452 | 8 | 15 | 87 | 0.85 | 99.81 | 0.84 | 0.84 | 0.84 |
| Example | 2 | 0.18 | 3424 | 9 | 20 | 85 | 0.81 | 99.78 | 0.83 | 0.81 | 0.81 |
| Example | 3 | 0.16 | 3412 | 9 | 18 | 86 | 0.82 | 99.81 | 0.81 | 0.82 | 0.82 |
| Example | 4 | 0.14 | 3450 | 7 | 6 | 93 | 0.92 | 99.80 | 0.81 | 0.85 | 0.76 |
| Example | 5 | 0.15 | 3454 | 10 | 20 | 84 | 0.90 | 99.84 | 0.83 | 0.81 | 0.82 |
| Example | 6 | 0.11 | 3440 | 18 | 13 | 75 | 0.75 | 99.80 | 0.85 | 0.84 | 0.85 |
| Example | 7 | 0.17 | 3428 | 8 | 21 | 85 | 0.68 | 99.75 | 0.84 | 0.82 | 0.82 |
| Example | 8 | 0.10 | 3420 | 7 | 11 | 90 | 0.88 | 99.80 | 0.87 | 0.87 | 0.86 |
| Comparative Example | 1 | 0.04 | 3452 | 8 | 13 | 85 | 0.81 | 99.78 | 0.78 | 0.69 | 0.66 |
| Comparative Example | 2 | 0.06 | 3412 | 9 | 11 | 83 | 0.80 | 99.77 | 0.76 | 0.69 | 0.67 |
| Comparative Example | 3 | 0.05 | 3428 | — | 14 | 90 | 0.89 | 99.76 | 0.73 | 0.66 | 0.65 |
| Comparative Example | 4 | 0.13 | 3504 | 12 | 18 | 81 | 0.75 | 99.81 | 0.74 | 0.70 | 0.68 |
| Comparative Example | 5 | 0.13 | 3490 | 5 | 0 | 92 | 0.50 | 99.81 | 0.74 | 0.70 | 0.68 |

INDUSTRIAL APPLICABILITY

The present invention can provide a composite semipermeable membrane which has high water permeability, and stable performances and fouling resistance before and after contact with an acid.

Although the present invention has been described in detail using specific embodiments, it will be apparent to those skilled in the art that various modifications and variations are possible without departing from the spirit and scope of the present invention.

This application is based on Japanese Patent Application (No. 2018-34858) filed on Feb. 28, 2018, and Japanese wherein
V is at least one structure selected from the structure group (i) below,
W is at least one structure selected from the structure group (ii) below,
and r is an integer of 2 or more;

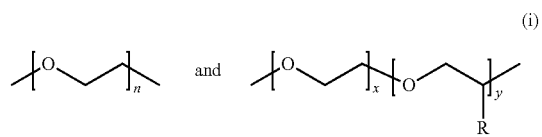

wherein, in the structure group (i),
n is an integer of 1 or more and 100 or less,
x and y are integers of 1 or more and 50 or less, and
R refers to a methyl group;

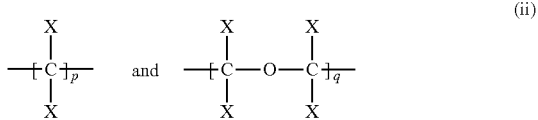

wherein, in the structure group (ii),
at least one of the X substituents is a fluorine atom, and the other remaining X substitutent(s) are a hydrogen atom, and
p and q are integers of 1 or more and 10 or less.

2. The composite semipermeable membrane according to claim 1,
wherein an amide bond is formed between the aliphatic polymer and the crosslinked aromatic polyamide.

3. The composite semipermeable membrane according to claim 1,
wherein a terminal of the aliphatic polymer is a carboxy group.

4. The composite semipermeable membrane according to claim 1, which satisfies the following conditions (A), (B), (C), and (D):
(A) intensity of a maximum peak between 3700 cm$^{-1}$ and 2900 cm$^{-1}$ is 0.08 or more in a difference spectrum of an infrared absorption (IR) spectrum measured under conditions of 25° C. and a relative humidity of 97% and an IR spectrum measured under conditions of 25° C. and a relative humidity of 3%;
(B) a peak top wave number of the difference spectrum between 3700 cm$^{-1}$ and 2900 cm$^{-1}$ is 3400 cm$^{-1}$ or more and 3550 cm$^{-1}$ or less;
(C) a peak of C1s has one or more maximum values within a range of 290 eV or more and 295 eV or less in X-ray photoelectron spectroscopy measurement performed by irradiating a coating layer side of the composite semipermeable membrane with X-rays; and
(D) the following formula (1): a+b≥10×(c+d+e) (1) is satisfied, in which a, b, c, d, e are respectively count numbers in the cases of m/z of positive secondary ions=45.03, 59.05, 104.03, 108.07, 135.06 when the coating layer side of the composite semipermeable membrane is measured by using time-of-flight secondary ion mass spectrometry.

5. The composite semipermeable membrane according to claim 4, wherein a limit depth from the coating layer side is 10 nm or less, at which at least one maximum value of the peak of C1s is detected within a range of 290 eV or more and 295 eV or less in the X-ray photoelectron spectroscopy measurement performed by irradiating the coating layer side of the composite semipermeable membrane with X-rays.

6. The composite semipermeable membrane according to claim 1, wherein the coating layer has a fold structure comprising a protruding portion and a recessed portion, and a proportion of protruding portions having a height of 100 nm or more among the protruding portions of the fold structure is 80% or more.

7. A composite semipermeable membrane element comprising the composite semipermeable membrane according to claim 1.

* * * * *